C. R. BANNIHR.
IMPLEMENT FOR PROJECTING AN AERODART.
APPLICATION FILED MAR. 29, 1910.
998,450.
Patented July 18, 1911.
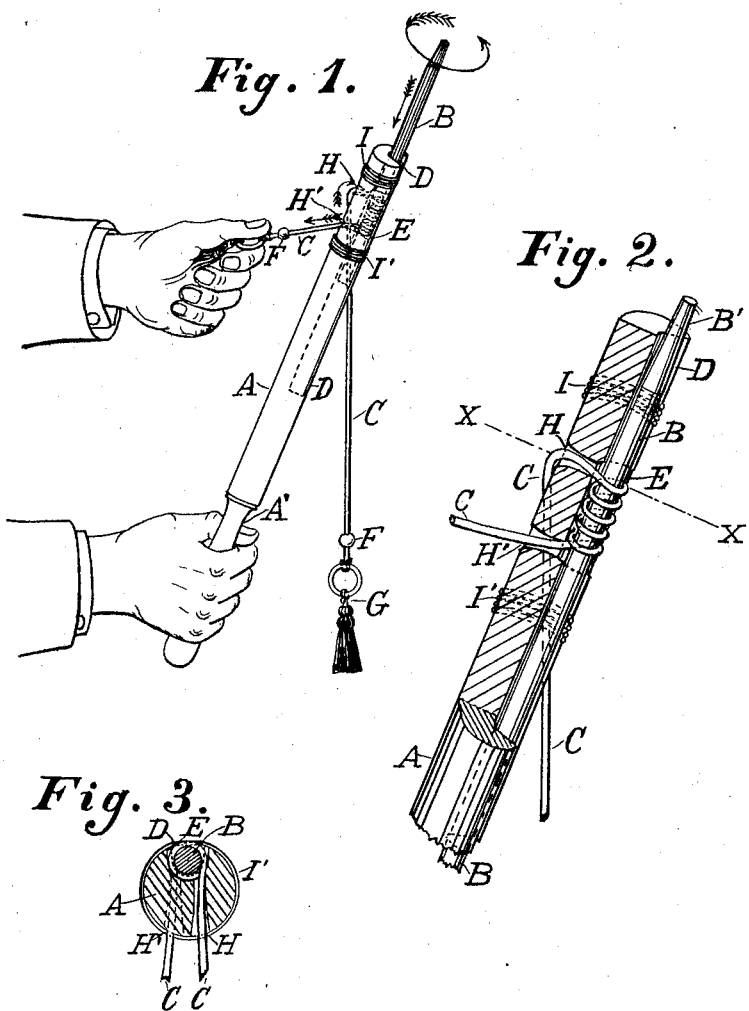
Witnesses.
William Harhural
George T. Davenport
Inventor.
Caesar R. Bannihr

UNITED STATES PATENT OFFICE.

CAESAR R. BANNIHR, OF NEW YORK, N. Y.

IMPLEMENT FOR PROJECTING AN AERODART.

998,450.     Specification of Letters Patent.     Patented July 18, 1911.

Application filed March 29, 1910. Serial No. 552,200.

*To all whom it may concern:*

Be it known that I, CAESAR R. BANNIHR, a citizen of the United States of America, a resident of the city, county, and State of New York, have invented a new and useful Improvement for Projecting an Aerodart, of which the following is a specification.

The object of the invention is, first, to provide a suitable means by which an aerodart may be projected through the air in such a manner that it may take a direction according to the will of the projector; second, to afford facilities by which the inclination and speed of an aerodart may be regulated; third, to arrange a simple and inexpensive construction of an implement for projecting an aerodart in any desired direction. I attain these objects by the device illustrated in the accompanying sheet of drawings, in which—

Figure 1 shows a perspective view of the device; Fig. 2 is an enlarged sectional view of the part of the device showing the shaft, cord, and groove forming its mechanism; Fig. 3 shows a cross section on the line x—x of Fig. 2.

Similar letters refer to similar parts throughout the several views.

The rod, or wand, A, hereinafter designated as the wand, shaft B, cord C, and groove D constitute the principal parts of the device. The wand A is made of wood, or other suitable material, and has a handle A' at one end and a groove D at the other end on one side of the wand. In this groove is an enlarged portion E about one-third of the way from the end of the wand, for the purpose of allowing space for a cord, and at each end of the enlarged portion is a hole H, H'. In the groove D is a shaft B, also in this instance made of wood, and round in shape, of a size to fit loosely in the groove, and a trifle longer than the length of the groove. At each end of the enlarged portion there is a band I, I', which serves to keep the shaft in place in the groove. These bands may be of any suitable material, as tape, cord, or leather. In this instance they are shown as cord wound around the wand. The ends of the shaft B are tapered, of a size to fit the hole in the hub of an aerodart.

The cord C may be of any material, such as a cable or fishline. It is coiled around the shaft B, the ends passed through the holes H, H'. At the ends are means for taking hold, as a ring or tassel G, and a short distance from each end there is a button F, which will prevent it from slipping through the hole as one or the other end is pulled and also serve as a stop.

It will be seen that the device is so constructed that an aerodart may be placed on the end of the shaft by means of the hole in the hub, and as the end of the shaft is tapered, by forcing the taper into the hole in the hub, it will hold with sufficient resistance to impart a whirling motion to the aerodart when the cord is pulled, as is indicated by the hands shown in Fig. 1.

The cord, being coiled around the shaft several times, according to the rotary speed desired, acts also as a screw thread, thus drawing the shaft in or out as one or the other end of the cord is pulled.

When the cord is pulled, as shown in Fig. 1 in the drawing, the shaft will be drawn downward releasing the aerodart from the end of the shaft, by stripping it from the shaft on the end of the wand, and, by its rotary motion, it will fly off at whatever inclination the wand may have at the time of release.

The implement is to be used to project an aerodart, a device for which I have obtained Letters-Patent from the United States, Aug. 17th 1909, and its purpose is to make the games, aerogolf, aerotennis, and all other games designed for the aerodart, more effective and more interesting.

While this instrument is particularly designed to project an aerodart it is not restricted to this purpose only as any windwheel or aerial propeller may be propelled and whirled by it.

What I claim as new and desire to secure by Letters Patent is—

An implement for projecting an aerodart consisting of a wand A with a handle A' and with a groove D on one side with an enlargement of a portion of said groove at E, and two holes H, H' transversely through said wand, one at each end of said enlarged portion, around shaft B with a taper B' at one end to fit loosely in said groove, a band at each end of said enlarged portion around the wand to keep the shaft in place, a cord C passing through the holes H, H' and spirally around the shaft for the purpose of revolving the shaft and imparting rectilinear motion at the same time, a button F to act as a stop for said cord, and means by which to take hold of said cord at the ends, all substantially as herein shown and described.

CAESAR R. BANNIHR.

Witnesses:
WILLIAM HARHURL,
GEORGE T. DAVENPORT.